United States Patent Office 2,796,945
Patented June 25, 1957

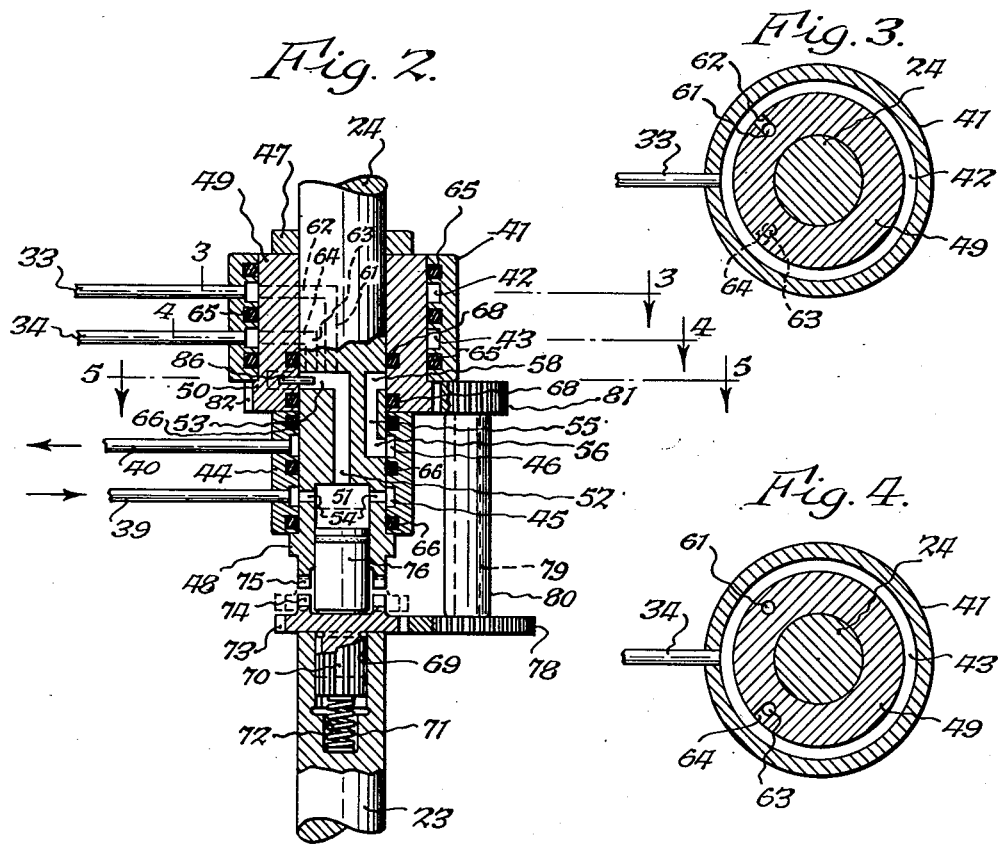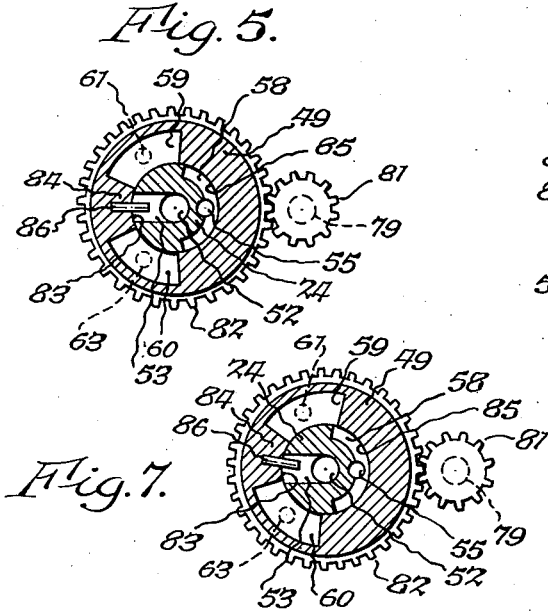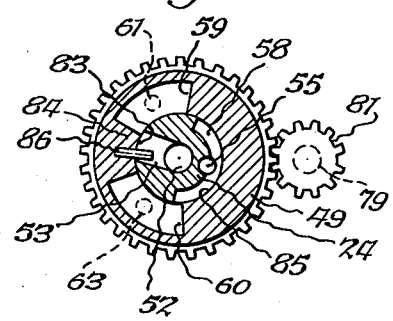

2,796,945

HYDRAULIC POWER STEERING WITH MANUAL STEERING INTERLOCK IN CASE OF POWER FAILURE

Edward R. Dye, Orchard Park, and Howard W. Naulty, East Aurora, N. Y., assignors to Cornell Aeronautical Laboratory, Inc., Buffalo, N. Y., a corporation of New York Application February 11, 1954, Serial No. 409,672

7 Claims. (Cl. 180—79.2)

This invention relates to improvements in hydraulic steering mechanisms for motor vehicles, and more particularly to the provision of a standby mechanical steering mechanism in the event of a failure in the hydraulic system.

The principal object of the invention is to provide a steering mechanism for motor vehicles which permits full hydraulic steering with any desired predetermined steering wheel to wheel ratio but in the event of hydraulic failure full mechanical steering at any desired predetermined mechanical ratio between steering wheel and wheels automatically results, thereby providing safe steering at all times.

A further object is to provide such a mechanical fail safe hydraulic steering mechanism which is relatively simple in construction, inexpensive to manufacture and not liable to get out of order or require repairs.

Other objects and advantages will be apparent from the following description and accompanying drawings in which:

Fig. 2 is a central longitudinal sectional view, on an enlarged scale, of that part of the apparatus shown immediately below the steering wheel in Fig. 1.

Figs. 3, 4 and 5 are enlarged transverse sectional views of the apparatus shown in Fig. 2 and taken on the correspondingly numbered lines therein.

Fig. 6 is a view similar to Fig. 5 but showing the parts in a different relative position, as for a right turn.

Fig. 7 is a view similar to Figs. 5 and 6 but showing the parts in a different relative position, as for a left turn from the position shown in Fig. 6.

Figure 1:
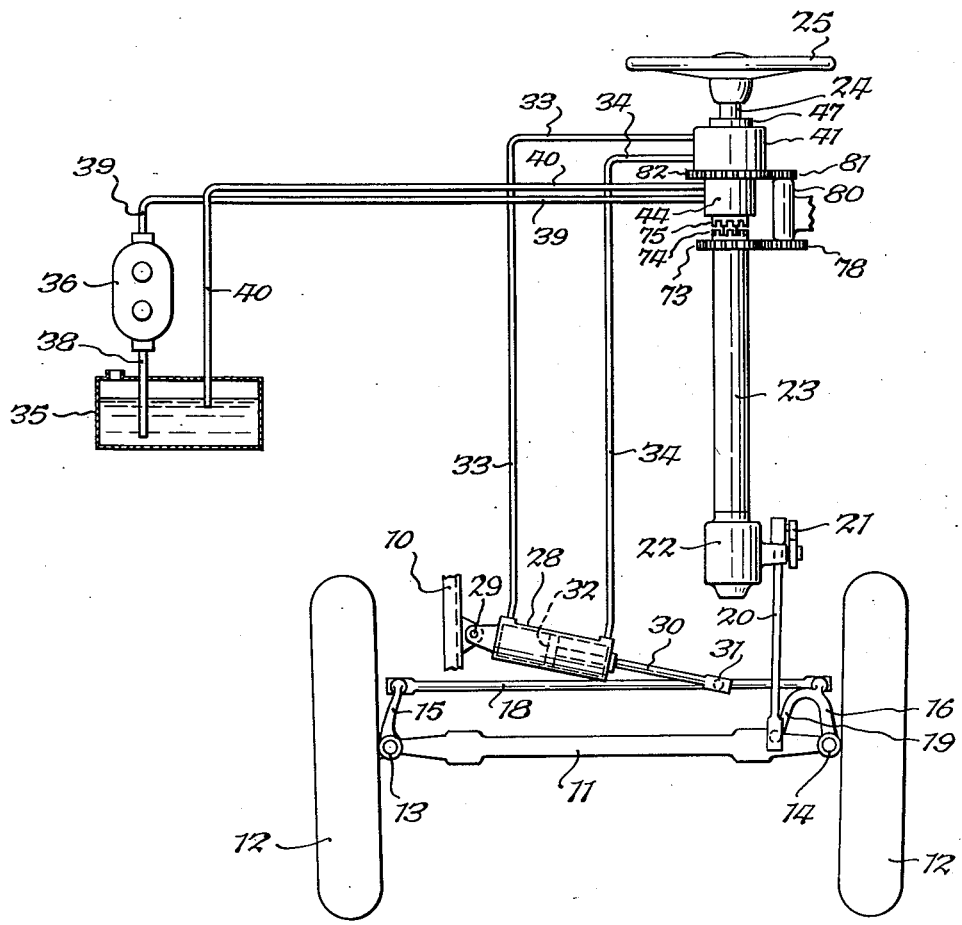
Fig. 1 is a plan view of a steering mechanism embodying the present invention and shown as applied to the front axle of a typical motor vehicle.

Referring to Fig. 1, there is shown fragmentarily a motor vehicle having a frame 10, a front axle 11 with a spindle at each end on which is suitably journaled a wheel 12, the spindles being pivoted to the axle at 13 and 14. Such construction is quite conventional as is also the steering linkage shown which includes a first steering knuckle arm 15 and a second knuckle arm 16 which are joined by a tie rod 18. The knuckle arm 16 is shown as formed to provide a thrust arm 19 to the end of which is suitably connected one end of the usual drag link 20, the other end of which connects with a steering arm 21. The steering arm 21 is shown as operatively associated with a gear box 22 to which a lower section 23 of a steering column is also shown as operatively connected. This steering column has an upper section 24 to which the usual steering wheel 25 is connected. The gear box 22 houses gears (not shown) which provide any desired predetermined ratio between the steering wheel 25 and the vehicle wheels 12.

If the sections 23 and 24 of the steering column were connected in the usual manner as a single shaft it will be seen that turning motion of the steering wheel 25 would be reduced through the gearing in the gear box 22 and which gearing may be of any desired predetermined ratio to actuate the steering arm 21 and through the drag link 20, thrust arm 19 and linkage including the members 15, 16 and 18, impart to the wheels 12 a predetermined angularity, thereby causing these wheels to run on substantially parallel curves.

An important feature of our invention is to associate turning movement of the steering wheel 25 with hydraulic means for actuating the steering linkage to effect turning of the wheels 12 in such way as to maintain the upper and lower sections 24 and 23 respectively of the steering column mechanically uncoupled, but should there be a failure of pressure in such hydraulic means, the said sections of the steering column are automatically mechanically coupled whereby the wheels 12 can be steered by the mechanical means previously described.

To this end, a cylinder 28 is shown at 29 as pivotally connected at one end to the vehicle frame 10 and from its opposite end a piston rod 30 emerges, the outer end of this rod being shown at 31 as suitably pivotally connected to the tie rod 18. The inner end of the piston rod 30 is connected to a piston 32 which can slide back and forth in the cylinder 28. This movement of the piston 32 is controlled by hydraulic liquid admitted and exhausted by operating lines 33 and 34 connected to the opposite ends of the cylinder 28. Thus when liquid under pressure is admitted to, say, line 33 the piston 32 will be driven to the right of the cylinder 28 as viewed in Fig. 1 and liquid on the right side of this piston is allowed to be exhausted through the line 34, thereby turning the wheels 12 in a clockwise direction about the vertical axes of the pivots 13 and 14. The wheels 12 turn to the right and therefore the line 33 may be termed a right turn line. If, on the other hand, liquid under pressure is admitted to the cylinder 28 through the line 34, the piston 32 is moved to the left and displaced liquid on the left of the piston is allowed to pass out the line 33, thereby turning the wheels in the opposite direction and accordingly the line 34 may be termed a left turn line.

For the purpose of providing liquid under pressure, a reservoir of liquid 35 is maintained in any suitable location on the vehicle from which reservoir a pump 36 draws liquid through the inlet line 38 shown as submerged in the liquid. The pump 36 may be of any suitable type and is shown as a conventional gear pump having the usual pressure relief or by-pass feature and is driven in any suitable manner such as by a power take off (not shown) from the engine on the vehicle, as will be understood by those skilled in the art. The outlet of the pump 36 is connected with a line 39 which delivers pressurized liquid when the pump is operating. Liquid is returned to the reserovir 35 by a return line 40.

The means for interconnecting the various lines 33, 34, 39 and 40 to accomplish the purposes of the present invention will now be described. Referring to Fig. 2, the lines 33 and 34 are suitably connected to a stationary tubular upper housing 41 which is shown as formed with a pair of vertically spaced internal annular grooves 42, 43 with which the lines 33 and 34 are respectively in communication. Similarly the lines 39 and 40 are suitably connected to a stationary tubular lower housing 44 which is also shown as formed with a pair of vertically spaced internal annular grooves 45, 46 with which the lines 39 and 40 are respectively in communication.

The lower stationary housing 44 is shown as embracing and engaging the cylindrical shaft 24 or upper section of the steering column which shaft is rotatable within this housing. The lower end face of this housing 44 is shown as engaging with an annular collar 48 formed integrally on the lower end of the shaft 24. The upper end face of the housing 44 is shown as engaging with the lower end face of a cylindrical tubular valve body 49 which also surrounds and engages the periphery of the shaft 24 and is relatively rotatable with respect thereto. The upper stationary housing 41 is shown as embracing and engaging the periphery of the valve body 49 which at its lower end is formed with an annular enlargement 50 which provides an upwardly facing shoulder which engages the lower end face of the upper housing 41. A retainer 47 arranged on the shaft 24 above the valve body 49 serves to maintain the axial positions of the valve body 49 and lower stationary housing 44 relative to this shaft. The upper stationary housing 41 may be maintained in proper relative axial position on the valve body 49 in any suitable manner.

It is to be noted that the housings 41 and 44 are stationary; that the shaft 24 is rotatable relative to the lower housing 44 and also relative to the valve body 49; and that the valve body is movable or rotatable relative to both the shaft 24 and upper housing 41.

The lower end of the shaft 24 forms a rotor which is shown as provided with a central cylindrical recess 51 from which a smaller vertical passage 52 extends which communicates at its upper end with a radial horizontal branch passage 53 which opens to the periphery of the shaft 24 below the level of the lower annular groove 43 in the upper stationary housing 41. The bore 51 is in communication with the lower annular groove 45 in the lower stationary housing 44 by horizontal lateral branch passages 54, 54 each of which at opposite ends opens to this bore 51 and groove 45. To one side of the vertical passage 52, the shaft 24 is shown as provided with a second vertical passage 55 having its lower end connected by a short horizontal lateral branch 56 to the upper annular groove 46 in the lower stationary housing 44. The upper end of this second vertical passage 55 is shown as connected with a horizontally arranged arcuate recess 58 in the periphery of the shaft 24 and which recess is arranged at the same level as the lateral branch 53, as best shown in Fig. 5.

At the level of the lateral branch 53 and arcuate recess 58 in the shaft 24, the movable valve body 49 is provided with circumferentially spaced internal arcuate recesses 59, 60 as shown in Fig. 5. The recess 59 is shown as communicating with the lower end of a vertical passage 61 which connects at its upper end with a horizontal lateral branch 62 opening to the periphery of the valve body 49 at the level of the upper groove 42 in the stationary upper housing 41. Similarly the recess 60 is shown as communicating with the lower end of a vertical passage 63 which connects at its upper end with a horizontal lateral branch 64 opening to the periphery of the valve body 49 at the level of the lower groove 43 in the stationary upper housing 41.

To protect against leakage of oil from the various oil grooves in the housings 41 and 44, oil seals such as O-rings 65 are provided on opposite sides of the grooves 42 and 43 in the upper housing 41 and similar O-rings 66 are provided on opposite sides of the grooves 45 and 46 in the lower housing 44. The radial branch 53 and arcuate recess 58 in the shaft 24 are sealed above and below by similar O-rings 68 arranged in internal grooves provided in the valve body 49, these seals 68 also protecting the arcuate recesses 59 and 60 in the valve body.

The upper shaft or section 24 is adapted to be mechanically coupled with the lower shaft or section 23 of the steering column. For this purpose, the upper end of the lower shaft 23 is provided with a central splined recess 69 in which a splined stub shaft 70 is slidably arranged for axial movement relative to the lower shaft 23. This splined stub shaft 70 is constantly urged upwardly by a helical compression spring 71 arranged in a well 72 at the inner end of the splined recess 69. The upper end of the splined stub shaft is enlarged and formed to provide a radial spur gear 73 and a face gear 74 on the upper side thereof. The face gear 74 opposes a similar face gear 75 facing downwardly from the lower end of the upper steering shaft 24. Arranged within the cylindrical bore 51 in this shaft 24 is a plunger 76 which projects from this bore so that its lower or outer end face engages the top of the splined stub shaft 70 and projects into the cup formed by the annular row of upstanding teeth forming the face gear 74.

In the condition of the parts shown in Fig. 2, the spur gear 73 is shown as meshing with a spur gear 78 fast to the lower end of a vertical jack shaft 79 arranged within a stationary bearing sleeve 80 and the upper end of this shaft 79 has fast thereto a spur gear 81 which meshes with an annular row of radial gear teeth 82 formed on the periphery of the enlargement 50 on the lower end of the valve body 49, the gear teeth 82 providing a spur gear.

*Operation*

Assuming the vehicle wheels 12 being arranged for straight ahead driving as shown in Fig. 1 and with the liquid pump 36 operating, it will be seen from Figs. 2-4 that liquid in the line 39 is under pressure and this pressure is transmitted to the lower annular groove 45 in the stationary lower housing 44 and from this groove through the branches 54 into the bore 51 above the plunger 76. The total force exerted by the pressurized liquid in the upper end of the bore 51 is sufficient to overcome the upward exertion of the spring 71 whereby the plunger 76 will hold the splined stub shaft 70 with its gear 73 in the full line position shown in Fig. 2 so that the gear 73 is maintained in mesh with the gear 78 and the opposing face gears 74 and 75 out of engagement as shown.

Liquid under pressure is also present in the vertical passage 52 and radial branch 53 in the upper steering shaft 24 but, as shown in Fig. 5, the outlet of this branch 53 is closed by the inner face 83 of a portion 84 of the valve body 49 intermediate the adjacent ends of the arcuate recesses 59 and 60 therein. The face 83 is slightly wider than the outlet of the branch passage 53. Still referring to Fig. 5, it is to be noted that the inner face 85 of the valve body 49 intermediate the remote ends of the arcuate recesses 59 and 60 has a slightly longer circumferential length than that of the arcuate recess 58 in the shaft 24. Thus communication of this recess 58 with either of the recesses 59 and 60 is prevented.

With all the parts in this condition it will be observed that the piston 32 in the hydraulic steering actuating cylinder is prevented from moving toward either end of this cylinder since a body of oil is trapped on opposite sides of the piston and in the lines 33 and 34. As to the line 33, it connects with the upper groove 42 in the stationary upper housing 41 and this groove in turn connects with the recess 59 through the passages 61 and 62 and this recess is cut off from communication with either the pressurized liquid in branch 53 or with the recess 58 which is connected with the return line 40 through the passages 55 and 56 and annular groove 46 with which this return line communicates. As to the line 34, it connects with the lower groove 43 in the upper housing 41 and this groove in turn connects with the recess 60 through the passages 63 and 64 and this recess is cut off from communication with either the pressurized liquid in branch 53 or with the recess 58.

Assuming now that the steering wheel 25 is turned for a right turn whereby the upper steering shaft 24 is rotated in a clockwise direction from the position shown in Fig. 5 to that shown in Fig. 6, it will be seen that the outlet for the passage 53 moves partially away from the face 83 thereby to uncover the leading or upper side of this outlet and establish communication between the recess 59 and passage 53. This permits pressurized liquid to flow into the recess 59 and through the passages 61 and 62, groove 42 and line 33 into the left end of the actuating cylinder 28 and thereby urge the piston 32 to the right as viewed in Fig. 1 to cause the wheels to pivot for a right turn. At the same time, it will be seen from Figs. 5 and 6 that the inlet or outer circumferential opening for the arcuate recess 58 moves partially away from the face 85 thereby to uncover the leading or lower side of this inlet and establish communication between the recesses 58 and 60. This permits liquid tending to be displaced by the piston 32 in the actuating cylinder 28 to flow through the line 34, groove 43, passages 64 and 63, now connected recesses 60 and 58, passages 55 and 56, groove 46 to the return line 40 which leads to the reservoir 35.

While the vehicle wheels 12 are so being turned to the right it is to be noted that the mechanical steering parts including the linkage 15, 16 and 18, thrust arm 19, drag link 20, arm 21, gears within the gear box 22 and lower steering shaft 23, are actuated so as to rotate this lower shaft 23 in a clockwise direction as viewed in Figs. 5 and 6. Inasmuch as the splined connection between the stub shaft 70 and lower steering shaft 23 compels this stub shaft to rotate in the same direction, the gear 73 on this stub shaft is also rotated in the same direction. This gear 73 then becomes a drive gear in a follow-up gear train consisting of the gears 73, 78, 81 and 82. The last or driven gear 82 in this train being fast to the valve body 49 causes this valve body to rotate in a clockwise direction as viewed in Figs. 5 and 6 relative to the upper steering shaft 24. As the valve body 49 so rotates in a clockwise direction relative to the shaft 24 the face 83 gradually closes off the passage 53 and the face 85 gradually closes off the recess 58 so that the parts are returned to the same relative position shown in Fig. 5 although the shaft 24 and valve body 49 will be in a different angular position from that shown in this figure. With the recesses 59 and 60 again blocked off the piston 32 is hydraulically locked in a new axial position in the actuating cylinder 28.

Assume that the steering wheel 25 is now turned for a left turn so as to straighten out the vehicle wheels 12 from the right turn position previously described. The upper steering shaft 24 will then be rotated in a counterclockwise direction from the position shown in Fig. 6 to that shown in Fig. 7. The outlet for the passage 53 moves partially away from the face 83 thereby to uncover the leading or lower side of this outlet and establish communication between the recess 60 and passage 53. This permits pressurized liquid to flow into the recess 60 and through the passages 63 and 64, groove 43 and line 34 into the right end of the actuating cylinder 28 and thereby urge the piston 32 to the left as viewed in Fig. 1 to cause the wheels 12 to pivot for a left turn. Simultaneously, the inlet for the arcuate recess 58 moves partially away from the face 85 thereby to uncover the leading or upper side of this inlet and establish communication between the recesses 58 and 59. This permits liquid tending to be displaced by the piston 32 in the actuating cylinder 28 to flow through the line 33, groove 42, passages 62 and 61, now connected recesses 59 and 58, passages 55 and 56, groove 46 to the return line 40 which leads to the reservoir 35.

While the vehicle wheels 12 are so being turned to the left, the follow-up gear train operates to rotate the valve body 49 in a counterclockwise direction as viewed in Figs. 6 and 7 relative to the upper steering shaft 24. As the valve body 49 so rotates in a counterclockwise direction relative to the shaft 24 the face 83 gradually closes off the passage 53 and the face 85 gradually closes off the recess 58 so that the parts are returned to the same relative position shown in Fig. 5 and in the same angular position as there shown. With the recesses 59 and 60 again blocked off the piston 32 is hydraulically locked in the former axial position in the actuating cylinder.

Of course, the above description of a counterclockwise rotation of the valve body 49 relative to the shaft 24 is representative of what takes place if the steering wheel 25 is swung for a left turn from a straight ahead drive position as well as the straightening out of a right turn specifically described.

Should the liquid pressure fail or drop below a predetermined value from whatever cause such as failure of the pump 36 or a leak in the pressure delivery line 39 or otherwise, the spring 71 will expand and lift the splined stub shaft 70 with its gear 73 and the plunger 76 to the broken line position for these parts shown in Fig. 2 whereby the gear 73 will be moved upwardly out of engagement with the gear 78. This serves to break the gear train connection between the gears 73 and 82 at the end of this train. Also the opposing face gears 74 and 75 are brought into engagement and mesh whereby the upper and lower shafts 24 and 23 respectively are mechanically coupled and in effect an integral steering column is provided and the vehicle wheels 12 are steered mechanically.

Disconnecting the gear train as above described leaves the valve body 49 a member freely rotatable relative to either the upper shaft 24 or the upper stationary housing 41. In order to maintain generally proper orientation of the valve body 49 relative to the upper shaft 24 in case the liquid pressure should again come up to effective operating level and the steering mechanism reconvert from mechanical to hydraulic operation, a pin 86 is shown as mounted in the portion 84 of the valve body and projects radially inwardly into the branch 53 in the upper shaft 24. Thus either radial side wall of this branch passage 53 can engage the pin 86 and force the valve body 49 to move in the same direction in which the shaft 24 is being turned by manipulation of the steering wheel 25.

Should the hydraulic pressure again be restored to operating level while the steering mechanism is engaged for mechanical operation, the shaft 24 and valve body are in usable position and the pressure will act upon the upper end of the piston 76 forcing the same against the urging of the spring 71 thereby disengaging the face gears 74 and 75 and reengaging the spur gears 73 and 78.

If desired a normally closed spring loaded working pressure valve (not shown) may be arranged in the pump output line 39 to close off this line automatically when the pressure therein falls below a minimum predetermined value even though still sufficient to prevent spring 71 from fully expanding to effect complete disengagement of the spur gears 73 and 78.

It is again pointed out that with the steering mechanism set up for hydraulic operation, the follow up gear train will have the desired steering wheel to vehicle wheel ratio which may have the same or different ratio from that used for mechanical steering and which is determined by the gears in the gear box 22.

From the foregoing it will be seen that the present invention provides an alternate hydraulic and mechanical steering mechanism which permits full hydraulic steering with any desired steering wheel to vehicle wheel ratio and also providing a fail safe feature which will permit full mechanical steering in the event of hydraulic failure at any desired mechanical ratio between steering wheel and vehicle wheels.

We claim:

1. A steering mechanism for vehicle wheels, comprising a hydraulic piston and cylinder device operatively associated with said wheels for turning the same and including operating lines connected to said cylinder on opposite sides of said piston, mechanical means operatively associated with said wheels for turning the same and including a first shaft, a second shaft, a steering wheel fast to said second shaft, and means operatively associating said second shaft alternately with said hydraulic device and said first shaft, said last means comprising a hydraulic system including pressure and return lines, valve means arranged to operatively connect said pressure and return lines severally with said operating lines in response to turning movements of said second shaft, said valve means including a rotor driven by said second shaft and a movable valve body surrounding said rotor and driven by said first shaft, and means arranged to mechanically couple said shafts in the event the pressure in said pressure line falls below a predetermined operating value.

2. A steering mechanism for vehicle wheels, comprising a hydraulic piston and cylinder device operatively associated with said wheels for turning the same and including operating lines connected to said cylinder on opposite sides of said piston, mechanical means operatively associated with said wheels for turning the same and including a first shaft, a second shaft, a steering wheel fast to said second shaft, and means operatively associating said second shaft alternately with said hydraulic device and said first shaft, said last means comprising a hydraulic system including pressure and return lines, valve means arranged to operatively connect said pressure and return lines severally with said operating lines in response to turning movements of said second shaft, said valve means including a rotor driven by said second shaft and a movable valve body surrounding said rotor and driven by said first shaft, said rotor having two independent chambers one of which is in constant communication with said pressure line and the other of which is in constant communication with said return line and both such chambers opening to the external surface of said rotor, said valve body having two independent passages one of which is in constant communication with one of said operating lines and the other of which is in constant communication with the other of said operating lines and both of said passages opening to the internal surface of said valve body and adapted severally to establish communication with said chambers during relative turning movement between said valve body and rotor, and means arranged to mechanically couple said shafts in the event the pressure in said pressure line falls below a predetermined operating value.

3. A steering mechanism for vehicle wheels, comprising a hydraulic piston and cylinder device operatively associated with said wheels for turning the same and including operating lines connected to said cylinder on opposite sides of said piston, mechanical means operatively associated with said wheels for turning the same and including a first shaft, a second shaft arranged coaxially with said first shaft, a steering wheel fast to said second shaft, and means operatively associating said second shaft alternately with said hydraulic device and said first shaft, said last means comprising a hydraulic system including pressure and return lines, valve means arranged to operatively connect said pressure and return lines with said operating lines in response to turning movements of said second shaft, said valve means including a rotor coaxial with and driven by said second shaft and opposing said first shaft and a movable valve body surrounding said rotor and driven by said first shaft, and means arranged to mechanically couple said rotor and first shaft in the event the pressure in said pressure line falls below a predetermined operating value, said last means comprising a member axially slidably but non-rotatively mounted on said first shaft adjacent said rotor, said member and rotor having elements adapted to interlock, yielding means urging said member toward interlocking engagement with said rotor, said rotor having an axial bore in communication with said pressure line and a plunger movably arranged in said bore and engaging said member and serving to hold said member and rotor out of engagement when the pressure acting on said plunger is sufficient to overcome said yielding means.

4. A steering mechanism for vehicle wheels, comprising a hydraulic piston and cylinder device operatively associated with said wheels for turning the same and including operating lines connected to said cylinder on opposite sides of said piston, mechanical means operatively associated with said wheels for turning the same and including a first shaft, a second shaft arranged coaxially with said first shaft, a steering wheel fast to said second shaft, and means operatively associating said second shaft alternately with said hydraulic device and said first shaft, said last means comprising a hydraulic system including pressure and return lines, valve means arranged to operatively connect said pressure and return lines with said operating lines in response to turning movements of said second shaft, said valve means including a rotor coaxial with and driven by said second shaft and opposing said first shaft and a movable valve body surrounding said rotor, means arranged to mechanically couple said rotor and first shaft in the event the pressure in said pressure line falls below a predetermined operating value, said last means comprising a member axially slidably but non-rotatively mounted on said first shaft adjacent said rotor, said member and rotor having opposing elements adapted to interlock, yielding means urging said member toward interlocking engagement with said rotor, said rotor having an axial bore in communication with said pressure line and a plunger movably arranged in said bore and engaging said member and serving to hold said member and rotor out of engagement when the pressure acting on said plunger is sufficient to overcome said yielding means, and follow up means operatively associating said first shaft with said valve body and arranged to turn said valve body on said rotor in response to turning movement of said first shaft when said rotor and member are disengaged, said follow-up means comprising a gear train drivingly connecting said member with said valve body, said gear train being adapted to be interrupted when said member mechanically interlocks with said rotor.

5. In an alternate hydraulic and mechanical steering mechanism, the combination with pressure and return lines and right and left turn operating lines of a steering column comprising two coaxial shafts, a valve device associated with one of said shafts comprising a tubular valve body surrounding and rotatable on said one shaft and having on its inside a pair of circumferentially spaced ports one of which is in communication with one of said operating lines and the other of which is in communication with the other of said operating lines, said one shaft having on its outside a pair of circumferentially spaced ports one of which is in communication with said pressure line and the other of which is in communication with said return line, said ports in said valve body being normally closed by said one shaft and said ports in said one shaft being normally closed by said valve body but upon relative rotation between said one shaft and valve body said ports therein can be placed in communication, axially facing gear teeth on the end of said one shaft opposing the other of said shafts, a member axially slidably but non-rotatively mounted on the end of said other shaft opposing said one shaft, axially facing gear teeth on the outer side of said member and opposing and adapted to engage with said gear teeth on said one shaft, spring means urging said teeth toward each other, an axially movable plunger mounted on said one shaft and engaging said member and actuated by the pressure of fluid in said pressure line to hold said gear teeth out of engagement, radial gear teeth on said member, radial gear teeth on said valve body, and a gear train engaging at opposite ends with both sets of radial gear teeth for turning said valve body in the same direction as said other shaft when said axially facing gear teeth are disengaged but said radial gear teeth on said member disengaging with said gear train when said axially facing gear teeth are engaged.

6. In an alternate hydraulic and mechanical steering mechanism, the combination with pressure and return lines and right and left turn operating lines of a steering column comprising two coaxial shafts, a valve device associated with one of said shafts comprising a tubular valve body surrounding and rotatable on said one shaft and having one its inside a pair of circumferentially spaced ports one of which is in communication with one of said operating lines and the other of which is in communication with the other of said operating lines, said one shaft having on its outside a pair of circumferentially spaced ports one of which is in communication with said pressure line and the other of which is in communication with said return line, said ports in said valve body being normally closed by said one shaft and said ports in said one shaft being normally closed by said valve body but upon relative rotation between said one shaft and valve body said ports therein can be placed in communication, axially facing gear teeth on the end of said one shaft opposing the other of said shafts, a member axially slidably but non-rotatively mounted on the end of said other shaft opposing said one shaft, axially facing gear teeth on the outer side of said member and opposing and adapted to engage with said gear teeth on said one shaft, spring means urging said teeth toward each other, an axially movable plunger mounted on said one shaft and engaging said member and actuated by the pressure of fluid in said pressure line to hold said gear teeth out of engagement, radial gear teeth on said member, radial gear teeth on said valve body, a gear train engaging at opposite ends with both sets of radial gear teeth for turning said valve body in the same direction as said other shaft when said axially facing gear teeth are disengaged but said radial gear teeth on said member disengaging with said gear train when said axially facing gear teeth are engaged, and stop means limiting the angular displacement of said other shaft and valve body when said gear train is disengaged with said radial gear teeth on said member.

7. In a hydraulic steering mechanism for motor vehicles, the combination comprising a steering column having two shafts normally drivingly disconnected, two pairs of lines, one pair including pressure and return lines and the other pair including right and left turn operating lines, a tubular valve body surrounding and rotatable on one of said shafts and having on its inside a pair of circumferentially spaced ports one of which is in constant communication with one of one pair of said lines and the other of which is in constant communication with the other of said one pair of lines, said one shaft having on its outside a pair of circumferentially spaced ports one of which is in constant communication with one of the other pair of said lines and the other of which is in constant communication with the other of said other pair of lines, said ports in said valve body being normally closed by said one shaft and said ports in said one shaft being normally closed by said valve body but upon relative rotation between said one shaft and valve body said ports therein can be placed in communication, said valve body being driven by the other of said shafts, and means for drivingly connecting said shafts and drivingly disconnecting said valve body and other shaft and arranged to be automatically effective upon failure of the hydraulic system.

References Cited in the file of this patent

UNITED STATES PATENTS

| | | |
|---|---|---|
| 1,657,412 | Schneider | Jan. 24, 1928 |
| 1,910,600 | Fitch | May 23, 1933 |
| 1,914,267 | Leupold | June 13, 1933 |
| 1,944,700 | Tait | Jan. 23, 1934 |
| 2,362,930 | Robbins | Nov. 14, 1944 |

FOREIGN PATENTS

| | | |
|---|---|---|
| 567,506 | Germany | Apr. 20, 1933 |